United States Patent
Zhang et al.

(10) Patent No.: US 11,467,817 B2
(45) Date of Patent: Oct. 11, 2022

(54) SOFTWARE COMPONENT DEFECT PREDICTION USING CLASSIFICATION MODELS THAT GENERATE HIERARCHICAL COMPONENT CLASSIFICATIONS

(71) Applicant: Adobe Inc., San Jose, CA (US)

(72) Inventors: Wei Zhang, Great Falls, VA (US); Christopher Challis, Alpine, UT (US)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 16/259,454

(22) Filed: Jan. 28, 2019

(65) Prior Publication Data

US 2020/0241861 A1 Jul. 30, 2020

(51) Int. Cl.
| | |
|---|---|
| G06F 8/65 | (2018.01) |
| G06F 8/70 | (2018.01) |
| G06N 20/00 | (2019.01) |
| G06K 9/62 | (2022.01) |
| G06F 40/44 | (2020.01) |
| G06F 40/284 | (2020.01) |

(52) U.S. Cl.
CPC .......... *G06F 8/65* (2013.01); *G06F 8/70* (2013.01); *G06F 40/284* (2020.01); *G06F 40/44* (2020.01); *G06K 9/6256* (2013.01); *G06K 9/6267* (2013.01); *G06K 9/6298* (2013.01); *G06N 20/00* (2019.01)

(58) Field of Classification Search
CPC . G06F 8/65; G06F 8/70; G06F 40/288; G06F 40/44; G06N 20/00; G06K 9/6256; G06K 9/6267; G06K 9/6298

USPC ........................................................ 717/168
See application file for complete search history.

(56) References Cited

U.S. PATENT DOCUMENTS

| | | | |
|---|---|---|---|
| 2014/0025608 A1* | 1/2014 | Miller | G06F 40/186 706/12 |
| 2015/0363292 A1* | 12/2015 | Shiraishi | G06F 11/3604 717/125 |
| 2017/0147910 A1* | 5/2017 | Mao | G06K 9/627 |

(Continued)

OTHER PUBLICATIONS

Shokripour, Ramin, et al., "Why So Complicated? Simple Term Filtering and Weighting for Location-Based Bug Report Assignment Recommendation", Mining Software Repositories (MSR), 2013 10th IEEE Working Conference, 11. IEEE, 2013, 10 pages.

(Continued)

*Primary Examiner* — Chat C Do
*Assistant Examiner* — Bradford F Wheaton
(74) *Attorney, Agent, or Firm* — Kilpatrick Townsend & Stockton LLP

(57) ABSTRACT

Systems and methods for facilitating updates to software programs via machine-learning techniques are disclosed. In an example, an application generates a feature vector from a textual description of a software defect by applying a topic model to the textual description. The application uses the feature vector and one or more machine-learning models configured to predict classifications and sub-classifications of the textual description. The application integrates the classifications and the sub-classifications into a final classification of the textual description that indicates a software component responsible for causing the software defect. The final classification is usable for correcting the software defect.

18 Claims, 6 Drawing Sheets

(56) References Cited

U.S. PATENT DOCUMENTS

| | | | |
|---|---|---|---|
| 2017/0300563 A1* | 10/2017 | Kao | G06F 16/337 |
| 2018/0032870 A1* | 2/2018 | Liu | G06Q 40/06 |
| 2018/0307904 A1* | 10/2018 | Patil | G06K 9/628 |
| 2018/0330821 A1* | 11/2018 | Kano | G16H 50/20 |
| 2018/0373723 A1* | 12/2018 | Levi | G06F 16/958 |
| 2019/0095836 A1* | 3/2019 | Zaourar Michel | G01C 21/343 |
| 2019/0272418 A1* | 9/2019 | Reihl | G06K 9/00469 |
| 2020/0193239 A1* | 6/2020 | Wilson | G06K 9/6267 |

OTHER PUBLICATIONS

Ye, Xin, et al., "Learning to Rank Relevant Files for Bug Reports Using Domain Knowledge", Proceedings of the 22nd ACM SIGSOFT International Symposium on Foundations of Software Engineering, ACM, Nov. 2014, 2 pages.

Zhou, Jian, et al., "Where Should the Bugs Be Fixed? More Accurate Information Retrieval-Based Bug Localization Based on Bug Reports", Software Engineering (ICSE), 2012 34th International Conference, 24, IEEE, 2012, 2 pages.

Anvik, John, et al., "Reducing the Effort of Bug Report Triage: Recommenders for Development-Oriented Decisions", ACM Transactions on Software Engineering and Methodology (TOSEM) vol. 20, Issue 3, Article 10, 2011, 2 pages.

Xia, Xin, et al., "Dual Analysis for Recommending Developers to Resolve Bugs", Journal of Software: Evolution and Process, vol. 27. Issue 3, Mar. 2015, 2 pages.

Tian, Yuan, et al, "Learning to Rank for Bug Report Assignee Recommendation", Program Comprehension (ICPC), 2016 IEEE 24th International Conference, IEEE, May 2016, 10 pages.

Jonsson, Leif, et al., "Automated Bug Assignment: Ensemble-Based Machine Learning in Large Scale Industrial Contexts", Empirical Software Engineering, vol. 21, Issue 4, Aug. 2016, 52 pages.

Rao, R. Bharat, et al., "On the Dangers of Cross-Validation. An Experimental Evaluation", Proceedings of the 2008 SIAM International Conference on Data Mining, SIAM, Apr. 2008, 9 pages.

* cited by examiner

300

Defect Description 310

↓

Topic Model 306

Feature Vector 320

↙ ↘

Component Classification Model 307  |  Sub-component Classification Model 308

353 →

| A | B | C | D |
|---|---|---|---|
| 60% | 20% | 15% | 5% |

← 354

| 15% | 80% | 5% | 5% |
|---|---|---|---|
| A1 | A3 | A3 | A4 |

↓ ↓

Hierarchical Classification Combiner 303

↓

Defect Classification 350

FIG. 3

SOFTWARE COMPONENT DEFECT PREDICTION USING CLASSIFICATION MODELS THAT GENERATE HIERARCHICAL COMPONENT CLASSIFICATIONS

TECHNICAL FIELD

This disclosure relates generally to machine learning. More specifically, but not by way of limitation, this disclosure relates to using machine learning to predict a software component responsible for causing a software defect based on a textual description of the defect.

BACKGROUND

Software often includes software defects in which, for example, the software does not perform according to design. Software defects may be discovered during software development or after software is deployed. In many cases, users or other developers can submit defect reports to the software developer. A typical defect report includes a description of the problem, an identification of when the problem occurs, and a description of how to reproduce the problem.

But software packages include many software components, which increases the complexity involved with identifying the particular software component causing a defect. Users who discover software defects often do not know which software components are contained within a particular software package, let alone have a way to discover which software component caused the defect. Hence, upon receiving a defect report from a user, developers responsible for defect triage must isolate the particular software component in which the defect occurs before any work can start on correcting the identified defect.

Existing tools for software defect reporting employ location-based and activity-based approaches. Location-based tools predict a location of a defect, or a bug, in a base of source code based on similar previously-isolated defects. Activity-based tools predict a software component based on a developer's previous submitted defects. But these solutions cannot produce accurate results, in part because historic defect reports contain mixed ground truth labels (some are labeled with classifications, some with sub-classifications). Consequently, the training the predictive model may be less-than ideal. In addition, these defect distributions can be non-uniform in one or more respects. In one example, data sets can be non-stationary in time because more defect reports are submitted for newer components than for older software components. In another example, the defect distribution can be non-uniform in component coverage if particular software components may have more software defect reports submitted than other components.

Accordingly, existing solutions are unable to reliably classify software defects.

SUMMARY

Systems and methods are disclosed for facilitating updates to software programs by determining a location of a software defect via machine learning techniques. In an example, a method accesses a textual description of a software defect in a software program. The software program has a set of functions for controlling a computing device. The method generates a feature vector from the textual description by applying a topic model to the textual description. The method determines a set of classifications by applying a first classification model to the feature vector. Each classification in the set of classifications includes a respective probability that the textual description is represented by the classification. The method further determines a set of sub-classifications by applying a second classification model to the feature vector. Each sub-classification includes a respective probability that the textual description is represented by the sub-classification. Each sub-classification is within one of the classifications. The method integrates the set of classifications and the set of sub-classifications into a final classification of the textual description that indicates a software component responsible for causing the software defect. The integration can include creating an aggregated set of classifications by aggregating sub-classifications associated with each of the set of classifications and calculating a final probability over each component by stacking the set of classifications and the aggregated set of classifications, resulting in a final classification. The final classification is usable for correcting the software defect by modifying one or more of functions via a development environment.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 3 depicts an example of a dataflow for classifying software defects, according to an embodiment of the present disclosure.

DETAILED DESCRIPTION

Figure 1:
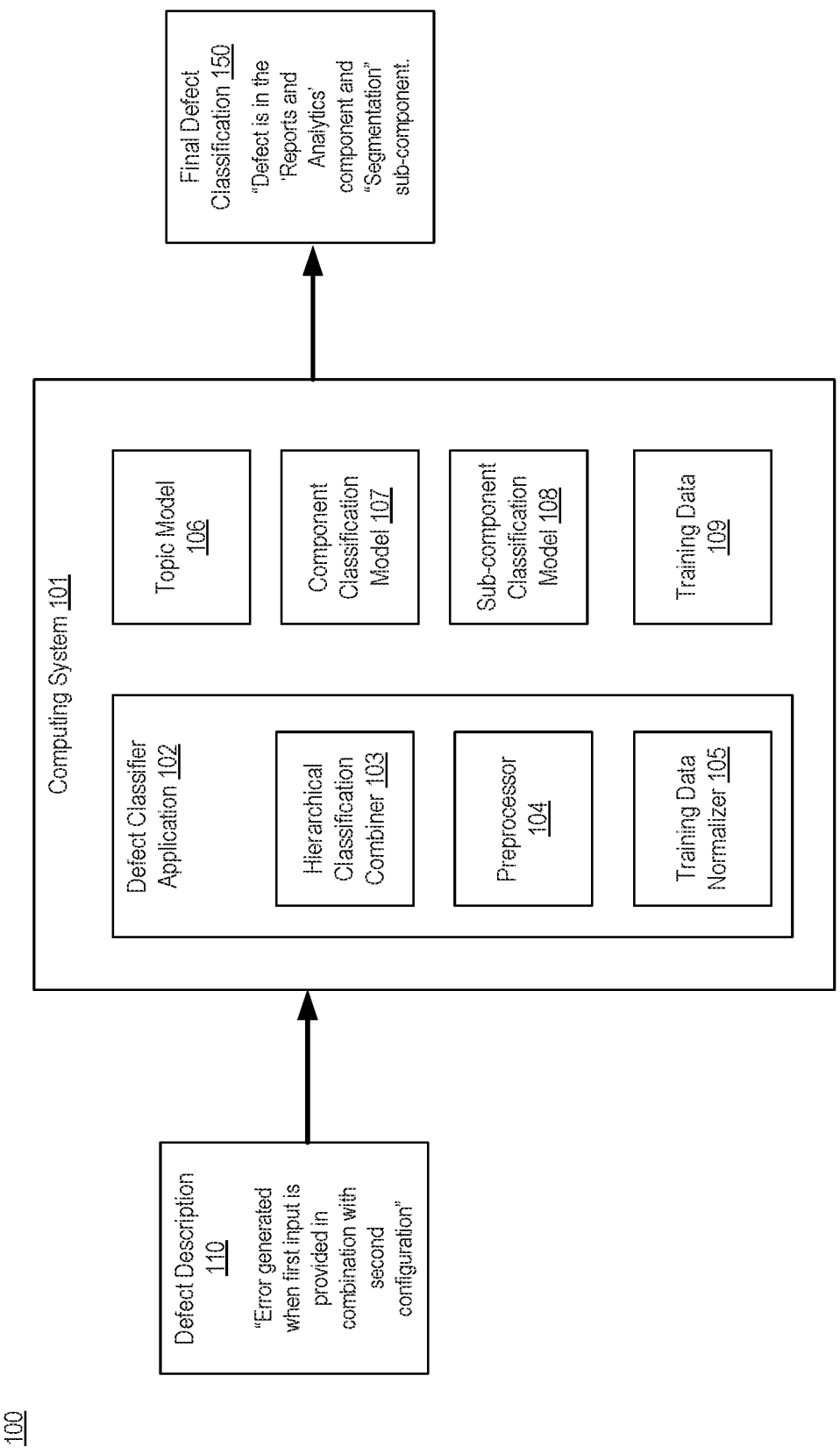
FIG. 1 is a diagram depicting an example of application components used for classifying software defects, according to an embodiment of the present disclosure.

Embodiments of the present invention predict software components responsible for causing software defects based on textual descriptions of the defects. More specifically, certain embodiments use machine learning models that are trained, using normalized training data, to predict hierarchical levels of component classification. Certain embodiments address limitations relating to non-uniform datasets that are present in existing solutions for software defect reporting. For instance, these embodiments adapt training data used for the classification models by normalizing training data on a defect-per-time basis and on a defect-per-component basis. Additionally, by configuring the classification models to predict hierarchical classifications (e.g., a classification and a sub-classification) certain embodiments reduce misclassification problems resulting from training data having ground truth labels from different, non-mutually exclusive classifications. Further, certain embodiments integrate the classification and sub-classification predictions by using probability propagation and refining, thereby leveraging the hierarchical predicted classifications. Thus, various embodiments facilitate corrections to defect software by, for example, generating more accurate predictions of a software component responsible for a particular defect.

The following non-limiting example is introduced for discussion purposes. A defect classifier application accesses a textual description of a software defect, for example a recently-submitted defect report. The application accesses a topic model developed from a set of training data that includes previously-identified software defects and corresponding classifications. The application generates a feature vector that represents the software defect by applying the topic model to the textual description.

The application accesses a first classification model and a second classification model trained from the training data. The application uses the models to determine a classification for the defect by applying the models to the feature vector. The first model outputs a set of classifications and the second model outputs a set of sub-classifications, representing a probability that the software defect is in a particular classification or sub-classification respectively. For example, a given software defect may be classified as in the "reports & analytics" classification and in the "reports & analytics: segmentation" sub-classification.

Continuing the example, the application integrates the set of classifications and the set of sub-classifications to determine a final classification by using probability propagation and refining. The application creates an aggregated set of sub-classifications associated with the classifications and stacks the set of classifications and the aggregated set of classifications to create a final probability. The final classification represents a particular software component which is responsible for causing the software defect. In some cases, the classification application can cause another software tool to remedy the identified software defect (e.g., by transmitting the final classification to a software development environment, storing the final classification in a location accessible to a software development environment, etc.).

As described herein, certain embodiments provide improvements to software development environments by solving problems that are specific to these environments. These improvements include more effectively isolating locations of software defects in software code and thereby allowing further refinement of the software code's operation. Identifying these defects is particularly difficult in a software platform due to multiple software components that interact with each other and a difficulty of determining a correspondence between a software defect report and a particular component causing the defect. The inability to identify these defects can limit a user's ability to use a software development tool to locate and correct defects, undercutting the effectiveness of the software development tool. Applying machine learning techniques to the defect-identification process addresses these difficulties by analyzing defects across a wide range of training data. This approach is particularly effective in a computing environment because machine learning techniques can discover inferences that a human could not determine, thereby more accurately and easily determining a location of a software defect.

Turning now to the Figures, FIG. 1 is a diagram depicting an example of application components used for classifying software defects, according to an embodiment of the present disclosure. FIG. 1 depicts software defect classifying environment 100, which includes one or more of defect description 110, computing system 101, and final defect classification 150. Computing system 101 includes one or more of defect classifier application 102, topic model 106, component classification model 107, sub-component classification model 108, and training data 109. An example of computing system 101 is discussed further with respect to FIG. 6.

Defect classifier application 102 uses topic model 106, component classification model 107, and sub-component classification model 108 to classify defect description 110 into final defect classification 150. Defect description 110 contains textual information about a determined software defect. Final defect classification 150 indicates a component that caused the software defect identified in defect description 110, and can therefore ultimately be used to correct the software defect.

Defect description 110 can include different information such as a problem description, an error message that was generated by a software package, or instructions on how to reproduce the defect. An example is shown here: "Problem: There are two logs displayed in Usage & Access Log page after viewing a project in workspace. Steps: 1. Login 2. Go to Workspace→Click an existing project to open it. Click Admin→Logs. Click 'Usage & Access Log.' Observe Result. There are two same logs about 'Project Viewed.' There should only 1 log display. Notes: The issue does not occur if deleting a project. The log of 'Project Deleted' is only 1 log. No 'Project Viewed' log displays if opening a project on PNW today. But we can see logs generated before, also have 2 same logs of 'Project Viewed.'"

Final defect classification 150 can include a description of the relevant component, such as "Admin Console: Code Manager," "Data workbench: Workstation," or "Reports & analytics: Segmentation." A component (or "super-component") can include one or more sub-components. For example, sub-component "Reports & analytics: Segmentation" belongs to the "reports & analytics" component. Large numbers of sub-components are possible for a component. For instance, "Data workbench" has 10+ sub-components. Examples include "Data workbench: Digital Analytics Profile" and "Data workbench: Executive Dashboard."

One or more classification models can be used to obtain final defect classification 150. As depicted, component classification model 107 and sub-component classification model 108 are trained to map a relationship between a feature vector and an associated labeled software component. More specifically, component classification model 107 and sub-component classification model 108 can be trained to output classification predictions that are hierarchical in nature. For example, component classification model 107 can be trained to predict a classification of defect description 110 and sub-component classification model 108 can be trained to predict a sub-classification of defect description 110, where a sub-classification is a sub-category of the classification.

To determine final defect classification 150, defect classifier application 102 can use hierarchical classification combiner 103, which integrates the results of component classification model 107 and sub-component classification model 108. As discussed further with respect to FIG. 2, different integration techniques can be used including probability propagation and refining.

Training data 109 can be used to generate topic model 106, train component classification model 107, or train sub-component classification model 108. Training data 109 includes defect descriptions and labeled classifications (e.g., component and/or sub-component). This data can be based on defects that occurred in practice and associated determined classifications. But as discussed, uniformity in data sets helps machine learning models improve classifications. Accordingly, defect classifier application 102 can use training data normalizer 105 to normalize training data 109 in one or more of time or by classification prior to such data being used to develop a topic model or to train classification models. An example of such a process is discussed further with respect to FIG. 4. Additionally, defect classifier application 102 can preprocess the data using preprocessor 104 to remove stop-words and tokenize the data.

Defect classifier application 102 can create topic model 106 from training data 109. When presented with a new software defect description, defect classifier application 102 uses topic model 106 to determine a feature vector from the description. Topic model 106 can be based on a language model that indicates words and associated frequencies of occurrence in the text. Defect classifier application 102 can first develop a language model to use for creating topic model 106.

Training data 109 can also be used to train component classification model 107 and sub-component classification model 108. Component classification model 107 and sub-component classification model 108 can be trained separately, with the same or different training data. Defect classifier application 102 can train the models, or the training can be done by a separate application.

Figure 2:
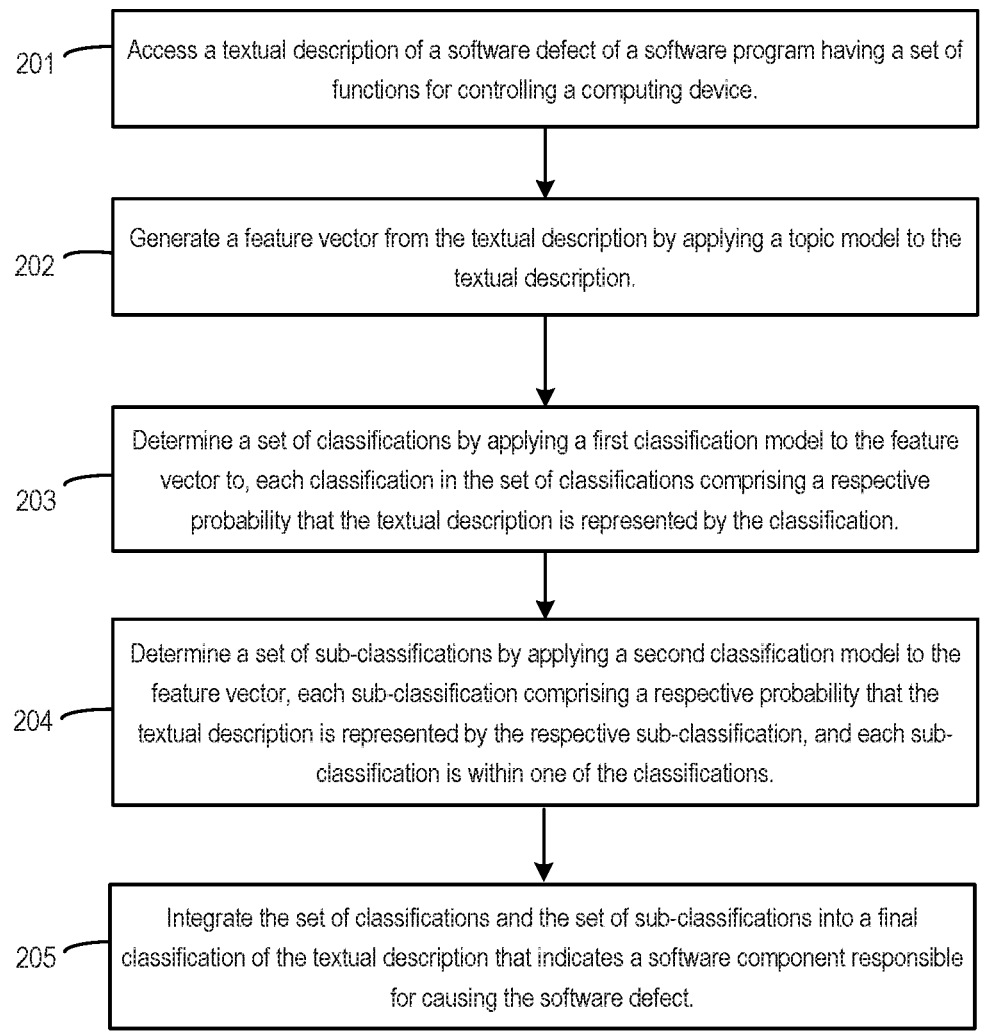
FIG. 2 depicts an example of a process for classifying software defects, according to an embodiment of the present disclosure.

FIG. 2 depicts an example of a process 200 for classifying software defects, according to an embodiment of the present disclosure. Process 200 can be implemented by defect classifier application 102 or another application. For discussion purposes, FIG. 2 is discussed in conjunction with FIG. 3. FIG. 3 depicts an example of a dataflow for classifying software defects, according to an embodiment of the present disclosure. FIG. 3 depicts classification environment 300, which includes defect description 310, topic model 306, feature vector 320, component classification model 307, sub-component classification model 308, component classifications 353, sub-component classifications 354, hierarchical classification combiner 303 and defect classification 350. Topic model 306, component classification model 307, sub-component classification model 308, are example implementations of topic model 106, component classification model 107, and sub-component classification model 108 respectively.

Returning to FIG. 2, at block 201, process 200 involves accessing a textual description of a software defect of a software program having a set of functions for controlling a computing device. Defect classifier application 102 accesses defect description 310, which includes a defect report such as the textual description "We did a test IMS migration with the customer care login company on 5/17. Most of us got some email spam (I received 7 emails), but one user in particular received over 200 emails. Any ideas what's going on here? Who should take this?"

Defect classifier application 102 optionally performs preprocessing on defect description 310 using preprocessor 104. Preprocessor 104 can tokenize the textual description (convert the description to tokens, which are strings with identified meanings). In some cases, preprocessing involves removing one or more stop words from the textual description. Stop words are commonly used words and can include, but are not limited to "the," "is" "at," "which," and "on."

At block 202, process 200 involves generating a feature vector from the textual description by applying a topic model to the textual description. Defect classifier application 102 generates a feature vector by applying topic model 306 to defect description 310. As discussed further with respect to FIG. 4, topic model 306 can be generated by defect classifier application 102 or by another application.

Returning to the example, defect classifier application 102 applies topic model 306 to the textual description (or tokenized textual description) to generate feature vector 320. Applying topic model 306 can include projecting the textual description into a defined feature space developed by topic model 306. The resulting feature indicates a presence of one or more topics in the textual description.

At block 203, process 200 involves determining a set of classifications by applying a first classification model to the feature vector to each classification in the set of classifications including a respective probability that the textual description is represented by the classification. While two classification models (component classification model 307 and sub-component classification model 308) are discussed with respect to process 200, more than two levels of hierarchy can be predicted using additional classification models configured to make predictions in a hierarchical manner.

Defect classifier application 102 provides feature vector 320 to a first classification model, e.g., component classification model 307, which outputs component classifications 353. As depicted in FIG. 3, component classifications 353 indicate four classes A-D with corresponding probabilities of 60%, 20%, 15% and 5% respectively.

While two models are depicted, any number of models organized in a hierarchical level of prediction is possible. Different techniques can be used such as deep neural networks (DNNs). For example, a DNN with four fully-connected layers with rectified linear unit (ReLU) as the activation function can be used to balance bias and variance.

At block 204, process 200 involves determining a set of sub-classifications by applying a second classification model to the feature vector. Each sub-classification includes a respective probability that the textual description is represented by the respective sub-classification. Each sub-classification is within one of the classifications.

Defect classifier application 102 provides feature vector 320 to a second classification model, e.g., sub-component classification model 308, which outputs sub-component classifications 354. As depicted in FIG. 3, component classifications 353 include four sub-classes A1-A4 with corresponding probabilities of 15%, 80%, 5% and 5% respectively. As depicted, sub-component classifications 354 include probabilities for component A, which was identified in component classifications 353 as the most likely classification. However, the component classifications 353 and the sub-component classifications 354 can refer to different classifications (e.g., classification "C" and sub-classification "A1"). Such a situation can be resolved at block 205.

At block 205, process 200 involves integrating the set of classifications and the set of sub-classifications into a final classification of the textual description that indicates a software component responsible for causing the software defect. In an example, probability propagation and refining is used. In an example, defect classifier application 102 integrates results from component classification model 307 and sub-component classification model 308 by analyzing the probabilities in the classifications of the respective model. For example, defect classifier application 102 can aggregate the sub-classifications associated with each of the set of classifications and calculate a final probability over each component by stacking the set of classifications and the aggregated set of classifications.

For example, for a given textual description, defect classifier application 102 obtains classification results from both component classification model 307, i.e. at the classification, or group-level, and sub-component classification model 308, i.e., at a sub or fine-grain level. Defect classifier application 102 combines the two sets of classifications to improve the final result over existing solutions that employ only one classification model.

More specifically, a probability distribution of the group level result can be denoted as $P_i$ and the fine-grained result can be denoted as $Q_i^j$, where $i \in [1, k]$, k is the number of super-components, $j \in [1, f^i]$, $f^i$ is the number of sub-components for the $i^{th}$ super-component. $Q_i^j$ are not over the same domain as $P_i$, but they are related hierarchically. Defect classifier application 102 improves the overall performance by propagating probability between the classifier outputs. Several approaches are possible.

First, the fine-grained results are aggregated to obtain group-level results. More specifically, $Q_i = \Sigma_{j=1}^{f^i} Q_i^j$ denotes a probability distribution over k super-components. Next, a final probability S is obtained by stacking two probabilities P and Q, where $S_i = P_i \times \alpha + Q_i \times (1-\alpha)$, $\alpha$ is a weighting parameter learned from validation data, so that the resulting $S_i$ achieves the best accuracy on the validation data. Finally, the fine-grained probability Q is updated by:

$$Q_i^j = \frac{S_i}{Q_i} \times Q_i^j$$

With this approach, an optimal super-component probability is obtained by stacking the two classifiers and propagating down to the sub-component level. The fine-grained probability $Q_i^j$ will increase if $S_i$ is bigger (because the component classifier assigns a higher probability to the $i^{th}$ component) and decrease $Q_i^j$ if $S_i$ is smaller. $Q_i^j$ is a probability distribution and sums to 1. As explained below, the hierarchical classification framework helps to increase performance numbers by at least 5% across all spectrum, including accuracy, recall@3, recall@5, and recall@10 for both group-level and sub-level predictions.

In some cases, integrating the set of classifications and the set of sub-classifications including weighting one or more of the classifications and the sub-classifications based on a parameter that indicates a relative accuracy of the classifications or the sub-classifications. Weighting parameter $\alpha$ indicates a relative accuracy between the component and sub-component predictions and can be learned subsequent to training the classification models. Calculation of weighting parameter $\alpha$ is performed in conjunction with training the classification models, and is further explained with respect to FIG. 4.

Returning to FIG. 2, final defect classification 150 is usable for correcting the software defect by modifying one or more of functions via a development environment. Defect classifier application 102 can modify one or more of functions corresponding to the final classification or cause a modification to be performed by an external device or application such as via a development environment.

Figure 4:
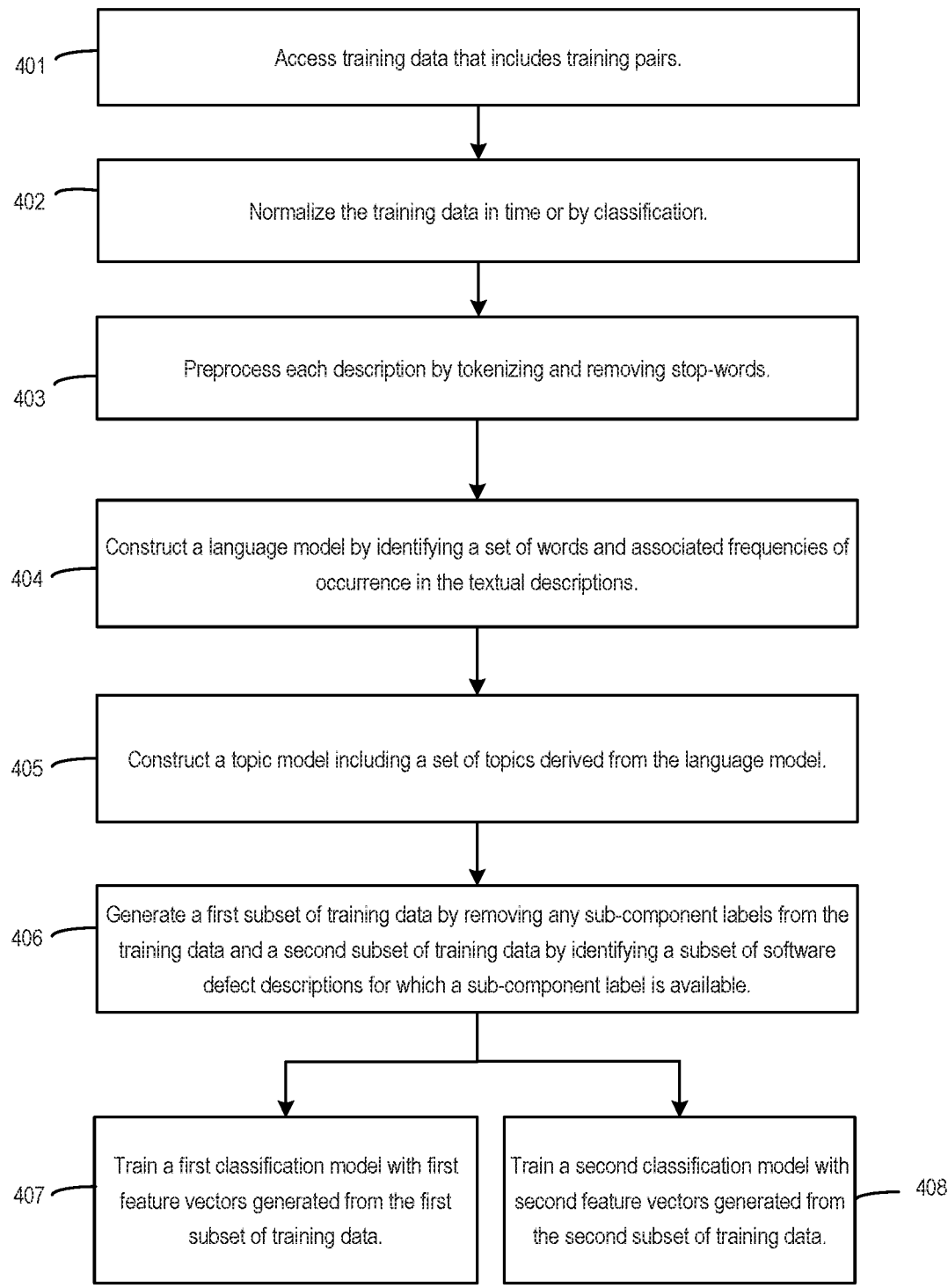
FIG. 4 depicts an example of a process for training one or more classification models to detect and classify software defects, according to an embodiment of the present disclosure.

FIG. 4 depicts an example of a process for training one or more classification models to detect and classify software defects, according to an embodiment of the present disclosure.

At block 401, process 400 involves accessing training data that includes training pairs. Training data 109 includes training pairs. Each training pair comprising a textual description of a software defect and a corresponding classification. The training pairs can be obtained empirically, e.g., from actual defects and human-determined classifications. Each classification includes one or more of a component label that indicates a classification in which the software defect occurred and possibly a sub-component label that indicates a sub-classification in which the software defect occurred. Training data 109 can be provided by or downloaded from an external device.

At block 402, process 400 involves normalizing the training data in one or more of in time or by classification. Defect classifier application 102 can normalize the training data in time, by classification, or both.

Training data 109 can be non-uniform in time, potentially biasing the classification models. Each training pair can include a timestamp that indicates when the defect was detected or logged. Because software defects are resolved over time, a given software component can have more defects earlier in the component's lifecycle than at other times. Given this likelihood, defect classifier application 102 can analyze training data 109 to determine a non-uniform distribution over time. If a threshold difference exists between time intervals, then defect classifier application 102 can remedy the imbalance by removing one or more training pairs from the data set or averaging multiple training pairs into one training pair.

Further, training data 109 can be non-uniform in classification, potentially biasing the classification models. For example, a first component may be overrepresented in the number of samples compared to a second component. Defect classifier application 102 can normalize training data 109 by determining that a difference between a first number of a first subset of training data pairs associated with a first classification and a second number of a second subset of training data pairs associated with a second classification is greater than a first threshold. Defect classifier application 102 can then adjust the first subset of training data pairs such that the difference is below a second threshold.

At block 403, process 400 involves preprocessing each description by tokenizing and removing stop-words. At block 403, defect classifier application 102 performs substantially similar operations to those described at block 201 of process 200.

At block 404, process 400 involves constructing a language model by identifying a set of words and associated frequencies of occurrence in the textual descriptions. Defect classifier application 102 builds a language model that is based on the frequency of words in training data 109. The language model is analogous to a dictionary, which is a subset of a language of the words used in the defect descriptions.

At block 405, process 400 involves constructing a topic model including a set of topics derived from the language model. Defect classifier application 102 generates a list of topics for topic model 306 from the language model constructed at block 404. As an example, a topic model can model text from a newspaper such as sports or politics. Representing the topics as a vector of [sports politics] could result in a sports article being mapped to [1 0] and a politics article being mapped to [0 1] and an article that covers both being mapped to [1 1].

Each topic is a weighted combination of related words. The determined topics are independent from and do not necessarily correspond to classifications or final classifications. Extracting a set of topics enables representing a software defect description as a mixture of these extracted topics. Because the total number of topics is preset, the weights of all topics form a fixed size vector. An example number of topics is 150 topics. In some cases, Latent Dirichlet Allocation (LDA) can be used to extract a preset number of topics from training data 109.

At block 406, process 400 involves generating a first subset of training data by removing any sub-component labels from the training data and a second subset of training data by identifying a subset of software defect descriptions for which a sub-component label is available.

Defect classifier application 102 generates the first subset of training data by removing sub-component labels, leaving only the component labels. For example, if a given training pair includes component "A3," then defect classifier application 102 removes "3," leaving a classification of "A." The first subset of training data is used to train component classification model 107. Therefore, the sub-components are aggregated to their group level label. For example, all "Data workbench: xxx" sub-components are merged into one component "Data workbench."

Defect classifier application 102 generates the second subset of training data by identifying any training data pairs that include a sub-component label. Some training data pairs may not have a sub-component label, for example, if one was never provided at data generation time. These training pairs are not added to the second subset. The second subset of training data is used to train sub-component classification model 108. Keeping only the data instances with sub-component labels avoids the problem created by mixed ground truth labels in the training data.

At block 407, process 400 involves training a first classification model with first feature vectors generated from the first subset of training data. Defect classifier application 102 generates a feature vector for each training data pair in the first subset by providing each training data pair to topic model 106.

Defect classifier application 102 iteratively trains the first classification model, e.g., component classification model 107, with the first subset of training data. For example, defect classifier application 102 applies component classification model 107 to a facture vector, obtains a first classification for the training pair, and updates internal parameters of the first classification model such that a loss function is minimized.

At block 408, process 400 involves training a second classification model with second feature vectors generated from the second subset of training data. Defect classifier application 102 generates a feature vector for each training data pair in the second subset by providing each training data pair to topic model 106.

Defect classifier application 102 iteratively trains the second classification model, e.g., sub-component classification model 108, with the second subset of training data. For example, defect classifier application 102 applies sub-component classification model 108 to a facture vector, obtains a second classification for the training pair, and updates internal parameters of the second classification model such that a loss function is minimized.

Accordingly, component classification model 107 and sub-component classification model 108 are trained in a similar manner with a distinction being that the data and labels provided to each model are different. But in some cases, the super-component classifier has an advantage in that it has more instances per class, resulting in more data and a more reliable model. Aggregating fine-grained labels is semantically meaningful, but defects belonging to the same super-component might actually be quite dissimilar. Accordingly, the two classifiers can operate in a complementary manner.

In an example, defect classifier application 102 separates training data 109 into training data, testing data, and validation data. Training is performed with the training data. After training the classification models, defect classifier application 102 can validate the models to discover weighting parameter $\alpha$ with the validation data and test the models with the testing data.

To determine the weighting parameter, defect classifier application 102 performs operations substantially similar to blocks 201-204 of process 200, with a difference that the validation data is used. Subsequent to calculating a classification and sub-classification of a given validation data pair, defect classifier application 102 compares the classifications to known outputs in order to calculate the accuracy of the sub-classification and classifications. Based on the relative accuracies, defect classifier application 102 calculates a weight that reflects a relative accuracy of the set of classifications and the set of sub-classifications.

Figure 5:
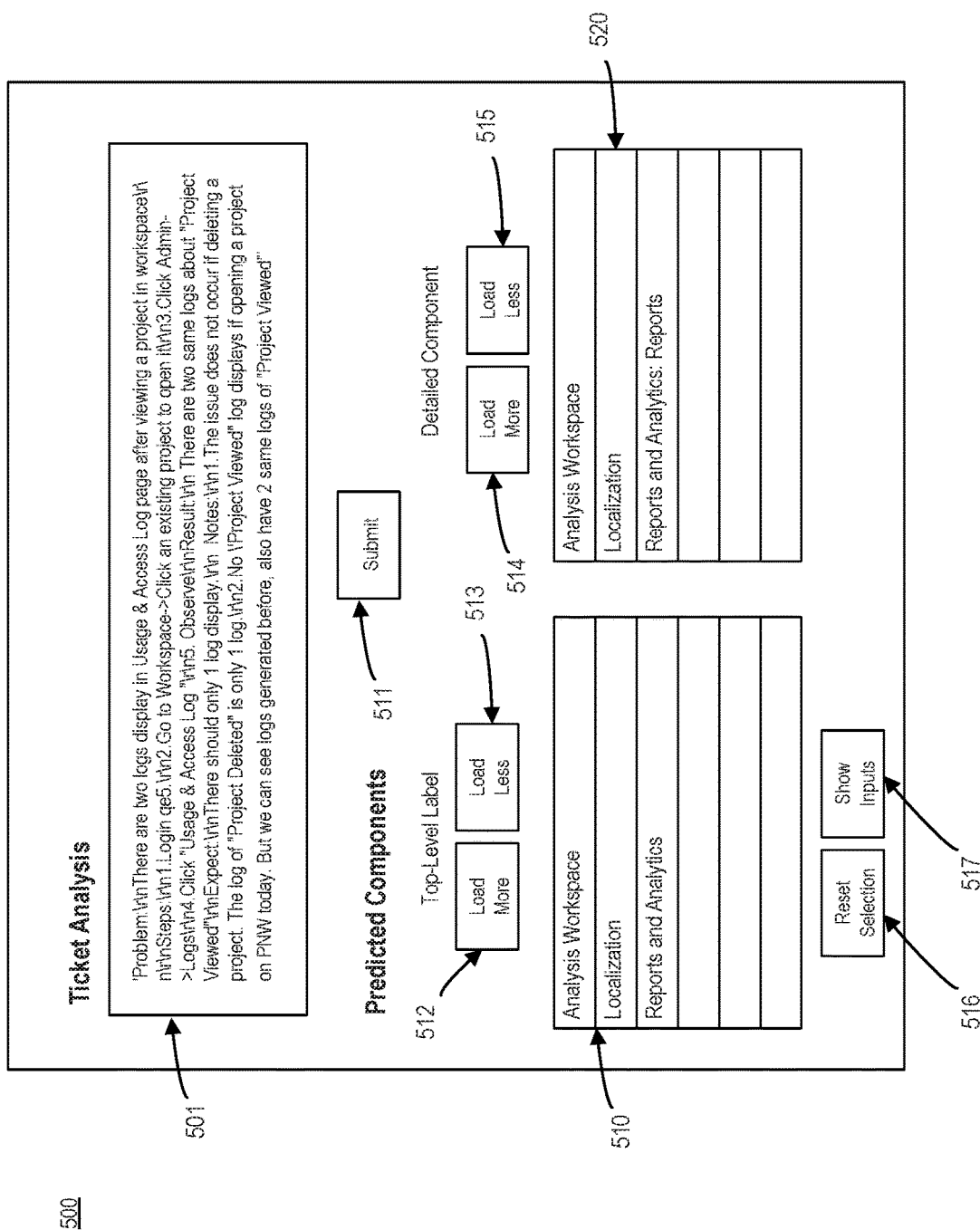
FIG. 5 depicts an example of a user interface for submitting software defects, according to an embodiment of the present disclosure.

FIG. 5 depicts an example of a user interface for submitting software defects, according to an embodiment of the present disclosure. FIG. 5 depicts software defect user interface 500, which includes ticket entry form 501, predicted components 510, detailed components 520, and buttons 511-517.

In an example, a user (such as a software developer or end user) interacts with user interface 500 to enter a software defect and obtain a classification using defect classifier application 102. More specifically, ticket entry form 501 receives text describing the defect. The user presses the "submit" button 511, which causes the defect to be provided as input to defect description 110. In turn, defect classifier application 102 determines a list of predicted components and sub-components, which are provided to user interface 500 in the predicted components 510 and detailed components 520 respectively. Predicted components 510 and detailed components 520 can each show details such as the probabilities of the respective classifications.

The user can then continue to interact with user interface 500 to obtain additional classifications by pressing button 512, to make the list of classifications smaller by pressing button 513. The user can obtain more sub-classifications by pressing button 514, or restrict the list by pressing button 515. Additionally, the user can reset the selection in ticket entry form 501 by pressing button 516, or show the inputs used by pressing button 517. In some cases, following input from button 511, the text in box 501 may disappear. Pressing button 517 causes the input text to reappear in box 501.

User interface 500 exposes both $Q_i^j$ (in predicted components 510) and $S_i$ (in detailed sub-components 520) to the user. The user can therefore choose the appropriate sub-component or component. In an example, interface 500 can show the top five components and top twenty sub-components following submission of a defect description. Additionally, the user can click on the group level label that to obtain more details.

Experimental Results

In an example, the Adobe Analytics® tickets from Jira® was used as training data 109. Training data 109 was split in the following manner. The tickets dated before 2018 (approximately 85,000 tickets) were used to build the language model and train two classifiers. During each training cycle, 90% of the data was randomly chosen to build classifiers and the remaining 10% were used to check the performance. The data from January 2018 to April 2018 (approximately 4,000 tickets) were used as the validation data for estimating the parameter α used in Algorithm 1. The validation data was then used to retrain the two classifiers. The classifiers were tested with data from May and June 2018 (approximately 2,500 tickets).

Various performance metrics were used. For example, accuracy, recall@1, recall@3, and recall@5 are used where Recall@k indicates the percentage of testing cases that the ground truth appears in the top k short list. Thus, recall@1 is the accuracy, the percentage of correct prediction when checking only the 1st result for each testing case. Performance is measured for the sub-component and super-component. Using our interactive tool, if a user perceives the 2nd super-component to be better, the user can select this component and focus on the respective sub-component.

As shown in Table 1 below, the super-component output is correct more than 50% of the time. A list of the top five components that determined as most likely to contain the defect includes the ground truth label most of the time. With respect to the fine-grained component prediction, the accuracy is 47%, and in over 70% of the cases, a list of the top five sub-components determined as most likely to contain the software defect includes the ground truth.

TABLE 1

|  |  | Training data (August 2004~April 2018) | Test data Since May 2018 |
| --- | --- | --- | --- |
| Super-component | accuracy | 0.66 | 0.57 |
|  | recall@3 | 0.84 | 0.77 |
|  | recall@5 | 0.89 | 0.83 |
|  | recall@10 | 0.96 | 0.92 |
| Sub-component | accuracy | 0.55 | 0.44 |
|  | recall@3 | 0.72 | 0.65 |
|  | recall@5 | 0.79 | 0.72 |
|  | recall@10 | 0.87 | 0.75 |

Exemplary Computing System

Figure 6:
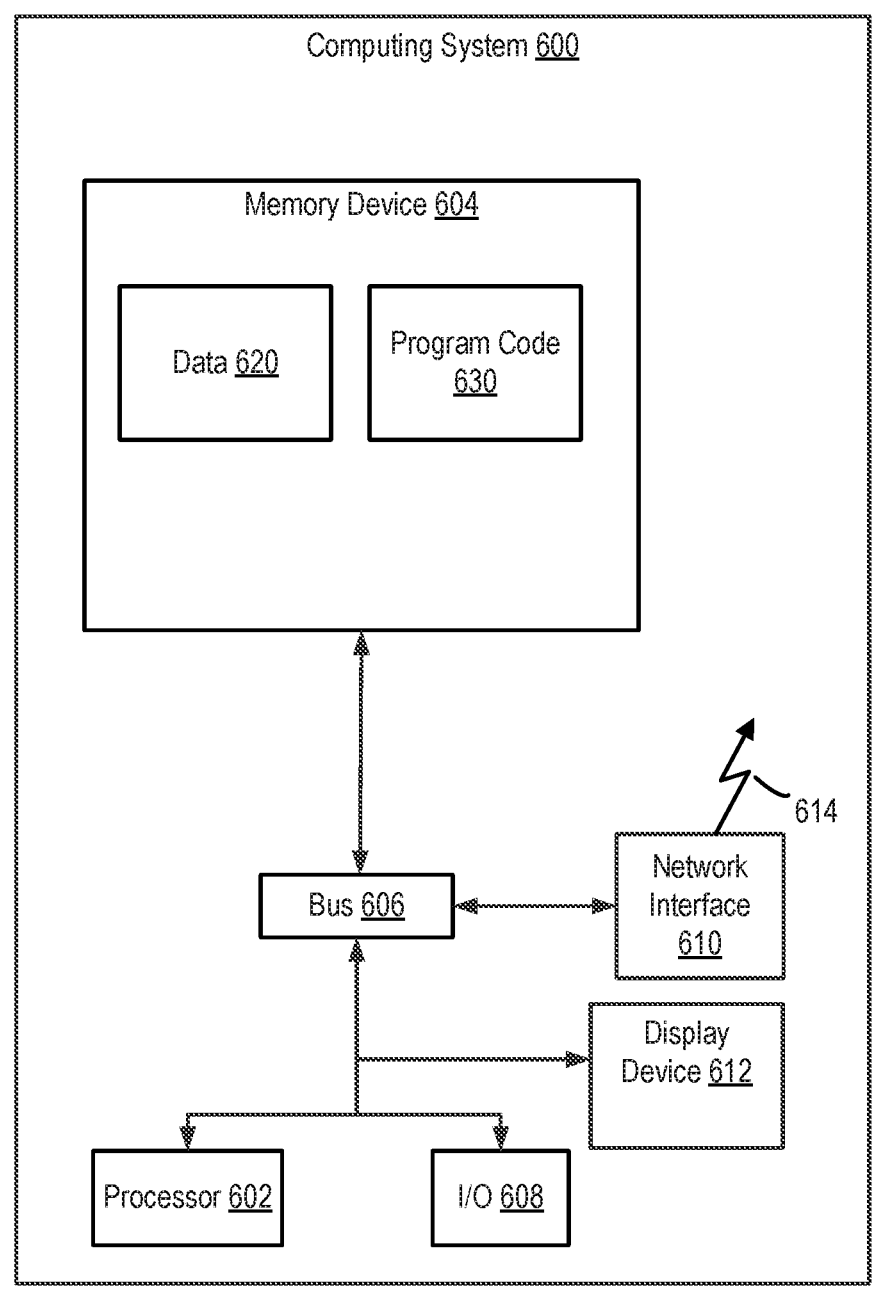
FIG. 6 depicts an example of a computing system for classifying software defects, according to an embodiment of the present disclosure.

FIG. 6 depicts an example of a computing system for classifying software defects, according to an embodiment of the present disclosure. Computing device 600 is an example of computing system 101 and can implement defect classifier application 102. Any suitable computing system may be used for performing the operations described herein. The depicted example of a computing device 600 includes a processor 602 communicatively coupled to one or more memory devices 604. The processor 602 executes computer-executable program code 630 stored in a memory device 604, accesses data 620 stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices or cores, including a single processing device. The functionality of the computing device may be implemented in hardware, software, firmware, or a combination thereof.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C #, Visual Basic, Java, or scripting language.

The computing device 600 may also include a number of external or internal devices, such as input or output devices. For example, the computing device 600 is shown with one or more input/output ("I/O") interfaces 608. An I/O interface 608 can receive input from input devices or provide output to output devices. One or more busses 606 are also included in the computing device 600. The bus 606 communicatively couples one or more components of a respective one of the computing device 600.

The computing device 600 executes program code 630 that configures the processor 602 to perform one or more of the operations described herein. For example, the program code 630 causes the processor to perform the operations described in FIG. 2 or 4.

The computing device 600 also includes a network interface device 610. The network interface device 610 includes any device or group of devices suitable for establishing a wired or wireless data connection to one or more data networks. The network interface device 610 may be a wireless device and have an antenna 614. The computing device 600 can communicate with one or more other computing devices implementing the computing device or other functionality via a data network using the network interface device 610.

The computing device 600 can also include a display device 612. Display device 612 can be a LCD, LED, touch-screen or other device operable to display information about the computing device 600. For example, information could include an operational status of the computing device, network status, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
    accessing a textual description of a software defect of a software program having a set of functions for controlling a computing device;
    generating a feature vector from the textual description by applying a topic model to the textual description;
    determining a set of classifications by applying a first classification model to the feature vector, each classification in the set of classifications comprising a first respective probability that the textual description is represented by the classification, wherein the first classification model includes a first set of learned parameters;
    determining a set of sub-classifications by applying a second classification model to the feature vector, wherein each sub-classification of the set of sub-classifications comprises a second respective probability that the textual description is represented by the sub-classification, wherein each sub-classification of the set of sub-classifications is within a classification of the set of classifications, wherein the second classification model includes a second set of learned parameters, and wherein the first set of learned parameters are separate from the second set of learned parameters;
    integrating the set of classifications and the set of sub-classifications to determine a final classification of the textual description that predicts a software component causing the software defect, wherein the final classification identifies a type of software component identified by a particular classification of the set of classifications and a sub-component identified by a particular sub-classification of the set of sub-classifications and corresponding to a sub-type of the type of software component of the particular classification; and
    causing, via a development environment, a modification of one or more functions of the software program using the final classification to correct the software defect.

2. The method of claim 1, further comprising, prior to generating the feature vector:
    removing one or more stop words from the textual description; and
    tokenizing the textual description, wherein the feature vector is generated by applying the topic model to the tokenized textual description.

3. The method of claim 1, wherein applying the topic model comprises projecting the textual description into a defined feature space.

4. The method of claim 3, wherein the defined feature space comprises a set of topics of a language model derived by determining a set of words and associated frequencies of occurrence from a corpus of training data and wherein the feature vector represents a presence of one or more topics in the textual description.

5. The method of claim 1, wherein the integrating further comprises:
    creating an aggregated set of classifications by aggregating, for each classification of the set of classifications, any associated sub-classifications of the set of sub-classifications; and
    calculating a final probability for the software component by stacking the set of classifications and the aggregated set of classifications.

6. The method of claim 1, wherein integrating the set of classifications and the set of sub-classifications comprises weighting one or more classifications of the set of classifications and one or more sub-classifications of the set of sub-classifications based on a relative accuracy of the classifications or the sub-classifications.

7. The method of claim 1, further comprising correcting, based on the final classification, the software defect by modifying one or more functions via the development environment.

8. The method of claim 1, further comprising:
    accessing training data comprising training pairs, each training pair comprising an additional textual description of an additional software defect and a corresponding additional classification, wherein each additional classification comprises one or more of (i) a component label that indicates an additional software component in which the additional software defect occurred and (ii) a sub-component label that indicates an additional software sub-component in which the additional software defect occurred;
    generating (i) a first subset of training data by removing the sub-component labels from the training data and (ii) a second subset of training data by identifying a subset of software defect descriptions comprising sub-component labels; and
    training (i) the first classification model with first feature vectors generated from the first subset of training data and (ii) the second classification model with second feature vectors generated from the second subset of training data, wherein the first classification model and the second classification model, as trained, are usable for facilitating updates to an additional software program that operates a computing system.

9. The method of claim 1, wherein the topic model is based on a language model that indicates words and associated frequencies of occurrence in text.

10. A system for correcting software defects, the system comprising:
 a non-transitory computer-readable medium storing computer-executable program instructions; and
 a processing device communicatively coupled to the non-transitory computer-readable medium for executing the computer-executable program instructions, wherein executing the computer-executable program instructions configures the processing device to perform operations comprising:
  accessing a textual description of the software defect, the software defect associated with a software program having a set of functions for controlling a computing device;
  generating a feature vector from the textual description by applying a topic model to the textual description;
  determining a set of classifications by applying a first classification model to the feature vector, each classification in the set of classifications comprising a first respective probability that the textual description corresponds to a software component identified by the classification, wherein the first classification model includes a first set of learned parameters;
  determining a set of sub-classifications by applying a second classification model to the feature vector, wherein each sub-classification of the set of sub-classifications comprises a second respective probability that the textual description corresponds to a sub-component of a software component, the sub-component represented by the respective sub-classification, wherein each sub-classification is within one of the classifications, wherein the second classification model includes a second set of learned parameters, and wherein the first set of learned parameters are separate from the second set of learned parameters;
  integrating the set of classifications and the set of sub-classifications into a set of aggregated probabilities, wherein the integrating comprises, for each classification of the set of classifications:
   identifying one or more of the sub-classifications that correspond to the classification; and
   stacking the probabilities of the identified one or more sub-classifications and the classification into an aggregated probability; and
  selecting, from the set of aggregated probabilities, an aggregated probability having a greatest probability of the aggregated probabilities;
  identifying the selected aggregated probability as a final classification of the textual description that indicates a software component causing the software defect, wherein the final classification identifies a software component identified by a particular classification of the set of classifications and a sub-component identified by a particular sub-classification of the set of sub-classifications and associated with the software component of the particular classification; and
  causing, via a development environment, a modification of one or more functions of the software program using the final classification to correct the software defect.

11. The system of claim 10, wherein executing the computer-executable program instructions configures the processing device to perform, prior to generating the feature vector, operations comprising:
 removing one or more stop words from the textual description; and
 tokenizing the textual description, wherein the feature vector is generated by applying the topic model to the tokenized textual description.

12. The system of claim 10, wherein applying the topic model comprises projecting the textual description into a defined feature space that comprises a set of topics of a language model derived by determining a set of words and associated frequencies of occurrence from a corpus of training data and wherein the feature vector represents a presence of one or more topics in the textual description.

13. The system of claim 10, wherein integrating the set of classifications and the set of sub-classifications comprises weighting one or more of the set of classifications and the set of sub-classifications based on a relative accuracy of the set of classifications or the set of sub-classifications.

14. The system of claim 10, wherein the system causes a second device to perform additional operations comprising:
 receiving the final classification from the system;
 identifying, from the final classification, the software defect; and
 correcting the software defect by modifying the one or more of functions via the development environment.

15. A non-transitory computer-readable medium having stored thereon instructions that, when executed by a processor, cause the processor to perform operations including:
 accessing a textual description of a software defect of a software program having a set of functions for controlling a computing device;
 generating a feature vector from the textual description by applying a topic model to the textual description;
 determining a set of software defect classifications by applying a first classification model to the feature vector, each software defect classification in the set of software defect classifications comprising a first respective probability that the textual description is represented by the software defect classification, wherein the first classification model is trained with a first subset of feature vectors generated from a first subset of training data, wherein the first subset of training data is generated by removing, from training data, sub-component labels that indicate in which sub-component the respective software defect occurred, and wherein the training data comprises textual descriptions of software defects and corresponding component labels that indicate in which component the respective software defect occurred;
 determining a set of software defect sub-classifications by applying a second classification model to the feature vector, each software defect sub-classification of the set of software defect sub-classifications comprising a second respective probability that the textual description is represented by the software defect sub-classification, wherein each software defect sub-classification of the set of software defect sub-classifications is within one of the software defect classifications, wherein the second classification model is trained with a second set of feature vectors generated from a second subset of the training data, wherein the second subset of the training data is generated by identifying, in the training data, a subset of software defect descriptions comprising sub-component labels; and
 integrating the set of software defect classifications and the set of software defect sub-classifications into a final software defect classification of the textual description that indicates a software component causing the software defect; and causing, via a development environment, a modification of one or more functions of the software program using the final software defect classification to correct the software defect.

16. The non-transitory computer-readable medium of claim 15, wherein the operations further comprise, prior to generating the feature vector:

removing one or more stop words from the textual description; and tokenizing the textual description, wherein the feature vector is generated by applying the topic model to the tokenized textual description.

17. The non-transitory computer-readable medium of claim 15, wherein applying the topic model comprises projecting the textual description into a defined feature space.

18. The non-transitory computer-readable medium of claim 17, wherein the defined feature space comprises a set of topics of a language model derived by determining a set of words and associated frequencies of occurrence from a corpus of training data and wherein the feature vector represents a presence of one or more topics in the textual description.

* * * * *